(12) United States Patent
Carlson et al.

(10) Patent No.: US 9,604,524 B1
(45) Date of Patent: Mar. 28, 2017

(54) TONNEAU COVER SYSTEM WITH TENSION ADJUSTMENT

(71) Applicant: TruXedo, Inc., Yankton, SD (US)

(72) Inventors: Joel L. Carlson, Tabor, SD (US); Michael R. Spencer, Hubbard, NE (US)

(73) Assignee: TruXedo, Inc., Yankton, SD (US)

(*) Notice: Subject to any disclaimer, the term of this patent is extended or adjusted under 35 U.S.C. 154(b) by 1 day.

(21) Appl. No.: 14/857,474

(22) Filed: Sep. 17, 2015

(51) Int. Cl.
   *B60J 7/04* (2006.01)
   *B60J 7/06* (2006.01)
   *B60J 7/10* (2006.01)

(52) U.S. Cl.
   CPC ........ *B60J 7/06* (2013.01); *B60J 7/104* (2013.01)

(58) Field of Classification Search
   CPC .......... B60J 7/02; B60J 7/04; B60J 7/06; B60J 7/10; B60J 7/104; B60J 7/12; B60J 7/1204; B60J 7/1217; B60J 7/141; B60J 7/198
   See application file for complete search history.

(56) References Cited

U.S. PATENT DOCUMENTS

| | | | | |
|---|---|---|---|---|
| 5,076,338 A | * | 12/1991 | Schmeichel | B60J 7/104 160/368.1 |
| 5,365,994 A | * | 11/1994 | Wheatley | B60P 7/04 160/354 |
| 5,906,407 A | * | 5/1999 | Schmeichel | B60J 7/104 296/100.15 |
| 6,257,647 B1 | * | 7/2001 | Ninness | B60J 7/104 160/290.1 |
| 6,293,608 B1 | * | 9/2001 | Dicke | B60J 7/104 296/100.15 |
| 6,543,835 B2 | * | 4/2003 | Schmeichel | B60J 7/102 135/907 |
| 6,575,520 B1 | * | 6/2003 | Spencer | B60J 7/10 296/100.01 |
| 6,808,221 B2 | | 10/2004 | Wheatley | |
| 6,811,203 B2 | | 11/2004 | Wheatley | |
| 7,954,876 B2 | * | 6/2011 | Kosinski | B60J 7/102 296/100.17 |
| 8,128,149 B1 | * | 3/2012 | Wolf | B60J 7/10 160/371 |
| 8,573,678 B2 | | 11/2013 | Yue | |

(Continued)

FOREIGN PATENT DOCUMENTS

DE 4210550 A1 * 10/1993 ............ B60J 7/06

*Primary Examiner* — Glenn Dayoan
*Assistant Examiner* — Paul Chenevert
(74) *Attorney, Agent, or Firm* — Harness, Dickey & Pierce, PLC (57) ABSTRACT

A pair of tension adjustment blocks can include one or more positioning members receivable in the tension adjustment block mounting aperture to define a selected one of a plurality of distances from the aperture to a corresponding end of the tension adjustment block. When the tension adjustment blocks are selectively arranged in one of a plurality of orientations with one of the positioning members inserted into the tension adjustment block mounting aperture of each of the side rails to define a selected distance, the corresponding end of each tension adjustment block retains a header at a selected fore/aft position related to the selected distance that is different from the other adjustment tension adjustment block orientations and related distances.

24 Claims, 6 Drawing Sheets

(56) References Cited

U.S. PATENT DOCUMENTS

| | | | |
|---|---|---|---|
| 8,714,622 B2* | 5/2014 | Spencer | B60P 7/02 296/100.01 |
| 9,221,380 B2* | 12/2015 | Spencer | B60J 7/085 |
| 9,254,735 B2* | 2/2016 | Spencer | B60J 7/185 |
| 2015/0239388 A1* | 8/2015 | Potter | B60P 7/04 296/100.12 |

* cited by examiner

TONNEAU COVER SYSTEM WITH TENSION ADJUSTMENT

FIELD

The present disclosure relates to tonneau cover systems for covering a cargo box, such as a pickup truck bed; and, more particularly, to such tonneau cover systems incorporating a tension adjustment mechanism.

BACKGROUND

This section provides background information related to the present disclosure which is not necessarily prior art.

Tonneau covers have been used for a number of years to cover the cargo box of pickup trucks against dirt, debris, and other environmental contaminants and to improve the aesthetic quality thereof. Tonneau covers can include a flexible cover of fabric, flexible plastic, or other flexible sheet material, such as canvas, vinyl plastic or other weather-resistant fabric. When deployed, the flexible cover is commonly secured between headers and to side rails forming a metal frame around the edge of the cargo bed. Because pickup trucks generally are used and stored outdoors, the fabric cover and the metal frame are exposed to the moisture, extreme heat and cold, dust, mud, rocks and other environmental conditions and material. Mechanisms have been developed to provide proper tensioning of the flexible sheet material to prevent flapping, sagging and other disadvantages. Nevertheless, there remains a need for such tensioning mechanisms with improved functional, cost, and/or use characteristics.

SUMMARY

This section provides a general summary of the disclosure, and is not a comprehensive disclosure of its full scope or all of its features.

In accordance with one aspect of the present disclosure, a tonneau cover system for covering a cargo box includes two side rails with at least one of the side rails including a tension adjustment block mounting aperture. A header extends between the two side rails and a fabric cover is coupled to the header. At least one tension adjustment block includes at least one positioning member that is receivable in the tension adjustment block mounting aperture to define a plurality of distances from the tension adjustment block mounting aperture to a corresponding end of the at least one tension adjustment block. When the at least one tension adjustment block is selectively arranged in one of a plurality of orientations with one of the at least one positioning member inserted into the tension adjustment block mounting aperture of the at least one side rail to define a selected one of the plurality of distances, the corresponding end of the tension adjustment block retains the front header at corresponding selected fore/aft position related to the selected one of the plurality of distances that is different from another of the plurality of orientations of the tension adjustment block with the at least one positioning member inserted into the adjustment block mounting aperture.

In accordance with another aspect of the present disclosure, a tonneau cover system for covering a cargo box includes two side rails with each of the side rails including a header mounting slot and a tension adjustment block mounting aperture. A header extends between the two side rails and a fabric cover is coupled to the header. Two fasteners are provided with each fastener extending through one of the header mounting slots to couple an end of the header to each of the side rails allowing fore and aft movement of the header along the side rails. Two tension adjustment blocks are provided with each tension adjustment block, including at least one positioning member receivable in the tension adjustment block mounting aperture to define a plurality of distances from the tension adjustment block mounting aperture to a corresponding end of the tension adjustment block. When each tension adjustment block is selectively arranged in one of a plurality of orientations with one of the at least one positioning member inserted into the tension adjustment block mounting aperture of each of the side rails to define a selected one of the plurality of distances, the corresponding end of each tension adjustment block engages and retains the front header at a selected fore/aft position corresponding to the selected one of the plurality of distances that is different from any other of the plurality of orientations of the tension adjustment block with the at least one positioning member inserted into the adjustment block mounting aperture.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
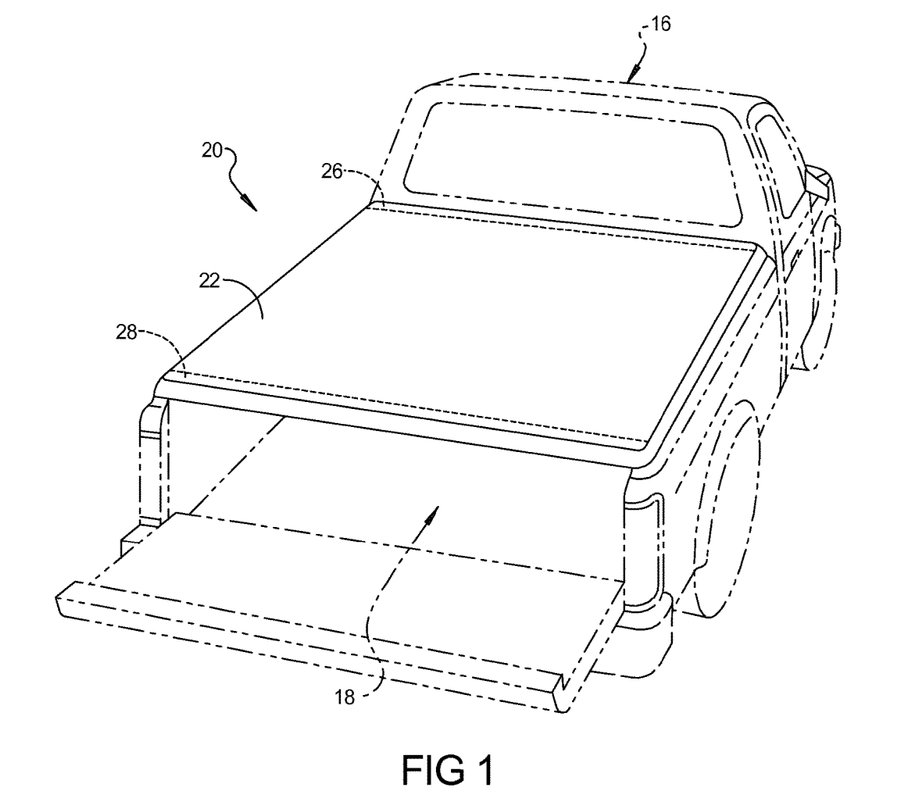
FIG. 1 is a perspective view of one exemplary embodiment of a tonneau cover system in accordance with the present disclosure with a tonneau cover deployed over the cargo box.
Figure 2:
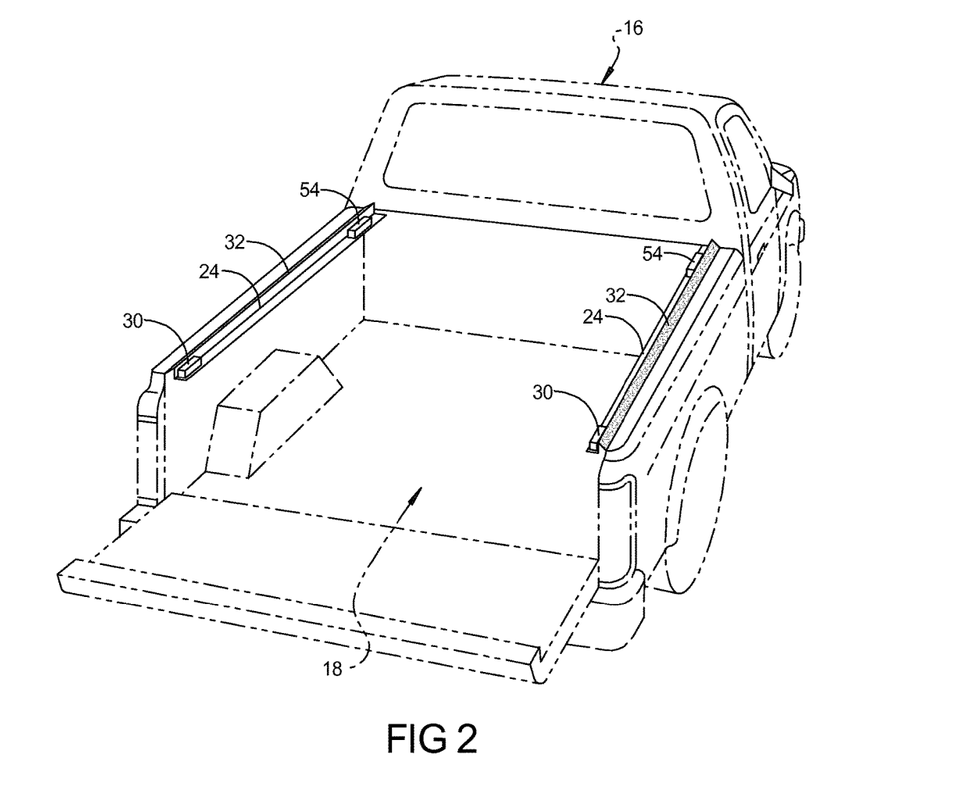
FIG. 2 is a perspective view similar to FIG. 1, but without the tonneau cover deployed over the cargo box to expose a simplified illustration of the side rails and components of the exemplary tonneau cover system of FIG. 1.

Referring to FIGS. 1-2, an exemplary embodiment of a tonneau cover system 20 of the present disclosure for a pickup truck 16 is illustrated. Some embodiments can include a roll-up flexible tonneau cover 22 and side rails 24 that can be clamped or otherwise positioned along sides of the cargo box 18 of the pickup truck 16. The tonneau cover 22 can have a front header 26 coupled along a front edge and a rear header 28 coupled along a rear edge of the tonneau cover 22. When the tonneau cover 22 is in a deployed position over the cargo box 18, each end of the front header 26 can be coupled to one of the side rails 24, each end of the rear header 28 can be selectively coupled to one of the side rails 24 via a bracket latch mechanism 30, and each side end of the tonneau cover 22 can be selectively coupled to one of the side rails 24 via a hook and loop fastener strip 32 or other suitable mechanism.

Figure 3:
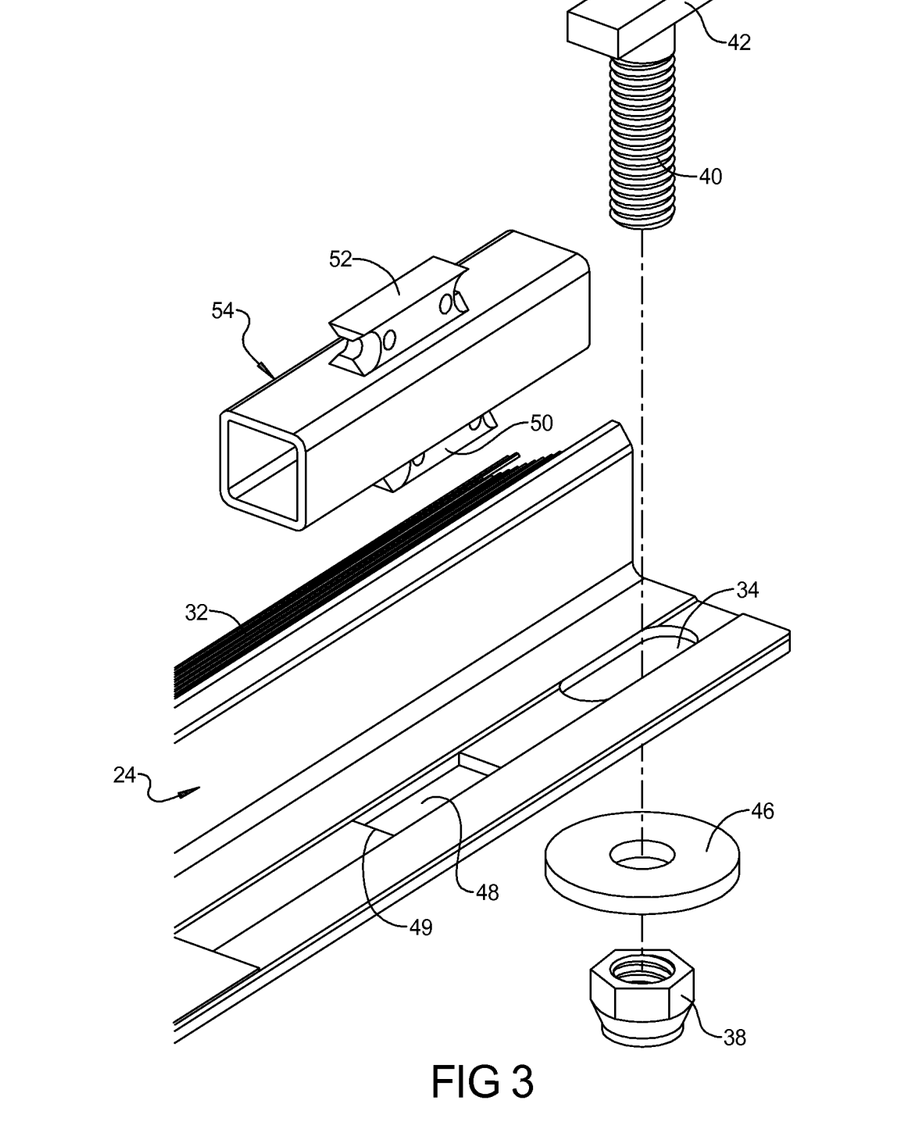
FIG. 3 is an enlarged partial exploded perspective view of the exemplary tonneau cover system of FIG. 1.
Figure 4:
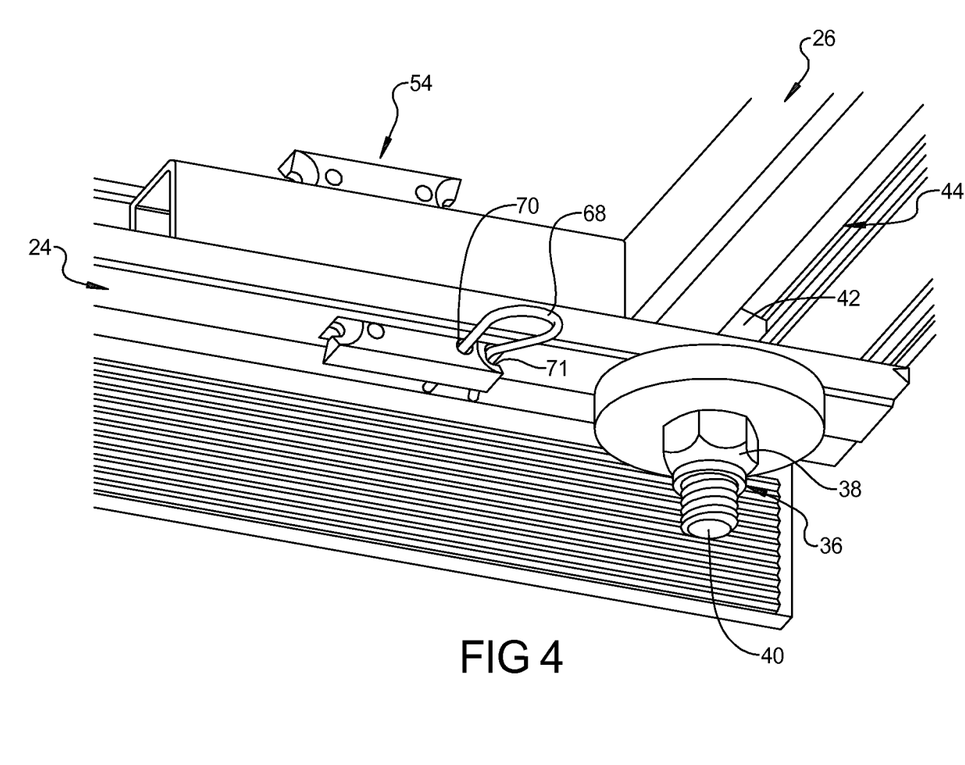
FIG. 4 is an enlarged partial upward perspective view of the exemplary tonneau cover system of FIG. 1.
Figure 5:
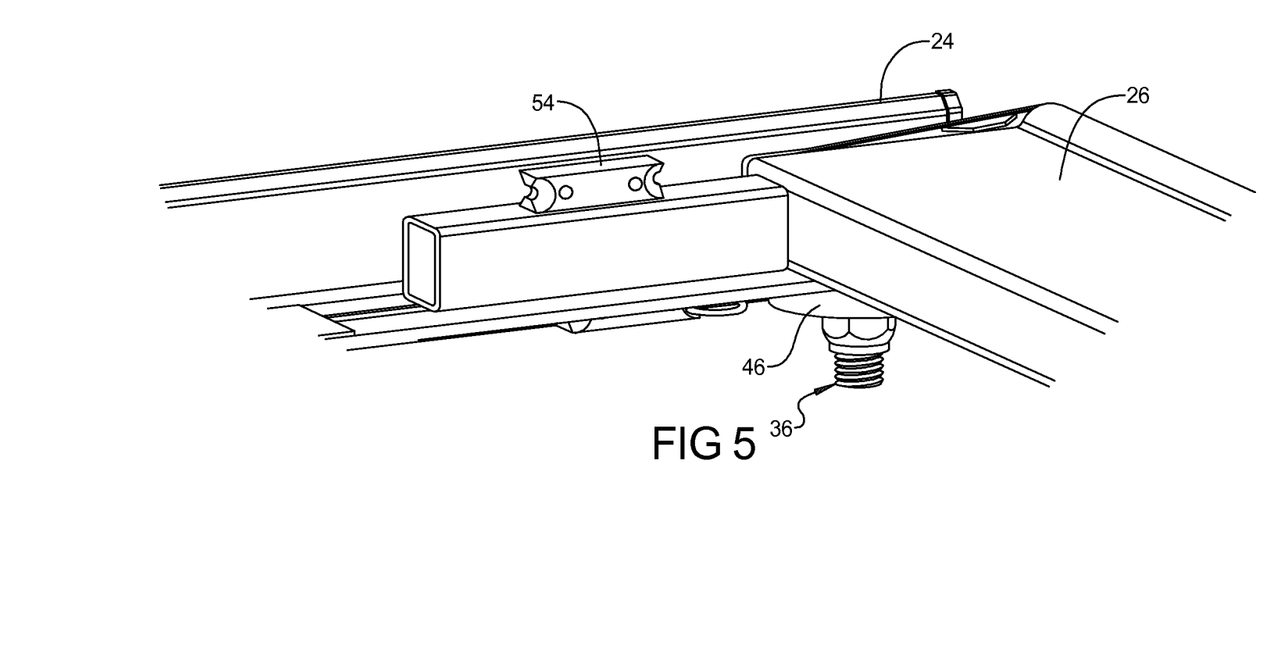
FIG. 5 is an enlarged partial downward perspective view of the exemplary tonneau cover system of FIG. 1.

Referring additionally to FIGS. 3-5, in some embodiments each side rail 24 can include a header mounting slot 34 with a fastener 36 extending through the slot 34 to couple an end of the header 24 to each side rail. For example, the illustrated fastener 36 is a nut 38 and bolt 40 where a head 42 of the bolt 40 is retained within a slot 44 of the header 24 and a threaded shaft of the bolt 40 extends through the header mounting slot 34. In some embodiments, a plastic washer 46 can be provided between the nut 38 of the fastener 36 and the side rail 24 to facilitate fore and aft movement of the header 26 relative to the side rails 24.

Each side rail 24 can additionally include a tension adjustment block mounting aperture 48 for receiving a positioning member 50, 52 of a tension adjustment block 54. The tension adjustment block 54 can include at least one positioning member 50, 52 receivable in the tension adjustment block mounting aperture 48 to define a plurality of distances from the tension adjustment block mounting aperture 48 or from an end of the at least one positioning member 50, 52 to a corresponding end of the at least one tension adjustment block 54 as discussed further below.

Each tension adjustment block 54 can be selectively arranged in one of a plurality of orientations with the at least one positioning member 50, 52 inserted into the tension adjustment block mounting aperture 48 of each of the side rails 24. A corresponding end of the tension adjustment block 54 can directly or indirectly engage the front header 26 to retain the front header 26 at a corresponding selected fore/aft position relative to the side rails 24 that is different from other of the plurality of orientations of the tension adjustment block 54 with the at least one positioning member 50, 52 inserted into the adjustment block mounting aperture 48.

Figure 6A:
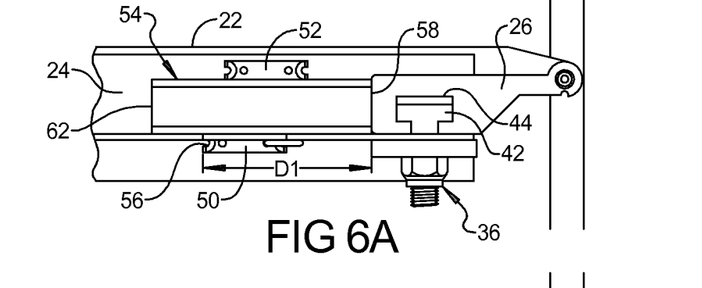
FIG. 6A is a partial cross-sectional view of the exemplary tonneau cover system of FIG. 1 illustrating the tension adjustment mounting block in a first orientation corresponding to a forward most position of the header.
Figure 6B:
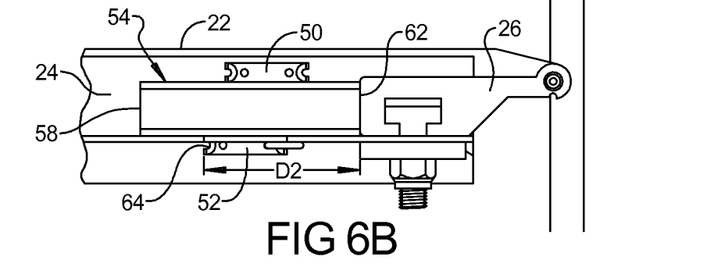
FIG. 6B is a partial cross-sectional view similar to FIG. 6A, but illustrating the tension adjustment mounting block in a second orientation corresponding to a less forward position of the header.
Figure 6C:
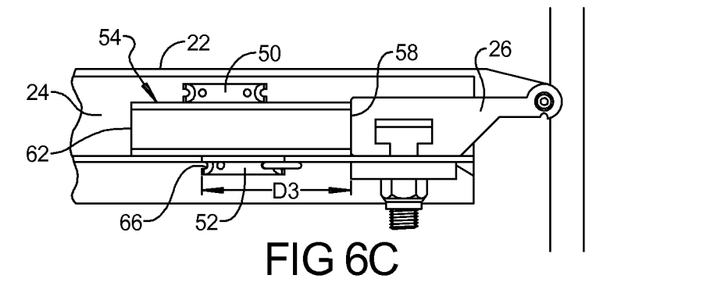
FIG. 6C is a partial cross-sectional view similar to FIG. 6B, but illustrating the tension adjustment mounting block in a third orientation corresponding to an even less forward position of the header.
Figure 6D:
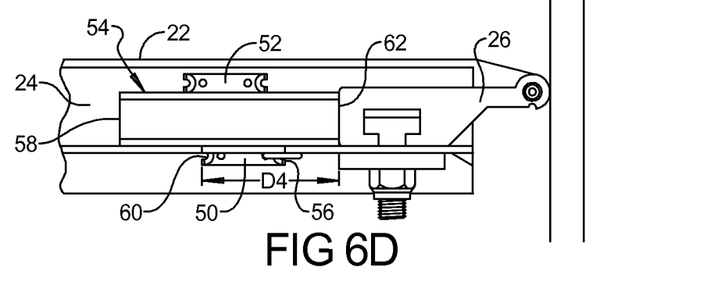
FIG. 6D is a partial cross-sectional view similar to FIG. 6A, but illustrating the tension adjustment mounting block in a fourth orientation corresponding to a rearward most position of the header.

Referring additionally to FIGS. 6A and 6D, the plurality of orientations of the tension adjustment block 54 can, in some embodiments, include locating a single positioning member 50 in the same tension adjustment block mounting aperture 48 in multiple orientations. For example, FIG. 6A illustrates a first orientation of the tension adjustment block 54 corresponding to a first fore/aft position of the header 26 relative to the side rail 24. In this first position, the positioning member 50 can be inserted into the tension adjustment block mounting aperture 48 to define a selected one D1 of a plurality of distances D1, D2, D3, and D4 between a first end 56 of the positioning member 50 or first end 49 of the aperture 48, and a corresponding first end 58 of the tension adjustment block 54 engaging against or retaining the header 26 in a corresponding first fore/aft position. This first position of the illustrated embodiment can define the greatest or largest distance D1 between an end 49 of the mounting aperture 48 (adjacent positioning member first end 56) and the header 26 (adjacent first end 58). Thus, this first position of this embodiment can position the header 26 in a most forward fore/aft position relative to the side rail 24 that can provide the greatest or largest potential tension on the fabric cover 22 coupled thereto.

Similarly, FIG. 6D illustrates a fourth orientation of the tension adjustment block 54 corresponding to a fourth fore/aft position of the header 26 relative to the side rail 24. In this fourth position, the same positioning member 50 can be inserted into the tension adjustment block mounting aperture 48 to define another selected one D4 of a plurality of distances D1, D2, D3, and D4 between a second end 60 of the positioning member 50 and a corresponding second end 62 of the tension adjustment block 54 engaging against or retaining the header 26 in a corresponding fourth fore/aft orientation. This fourth orientation of the illustrated embodiment can define the least or smallest distance D4 between an end 49 of the mounting aperture 48 (adjacent positioning member 50 second end 60) and the header 26 (adjacent adjustment block 54 second end 62). Thus, this fourth position of this embodiment can position the header 26 in a most rearward fore/aft position relative to the side rail 24, which can provide the least or smallest potential tension on the fabric cover 22 coupled thereto.

In some embodiments, the plurality of orientations of the tension adjustment block 54 can additionally or alternatively include locating a different one of multiple positioning members 50, 52 in the same tension adjustment block mounting aperture 48. For example, as illustrated and discussed above with reference to FIG. 6A, a first orientation of the tension adjustment block 54 corresponding to a first fore/aft position of the header 26 related to distance D1 can include inserting a first positioning member 50 on a first face of the adjustment block 54 into the mounting aperture 48. As illustrated in FIG. 6B, a second orientation of the tension adjustment block can include inserting a second positioning member 52 on another face of the tension adjustment block 54 into the mounting aperture 48. FIG. 6B illustrates a second orientation of the tension adjustment block 54 corresponding to a second fore/aft position of the header 26 relative to the side rail 24. In this second position, the second or another positioning member 52 of the adjustment block 54 can be inserted into the tension adjustment block mounting aperture 48 to define a selected distance D2 between an end 64 of the positioning member 52 or an end 49 of the aperture 48, and a corresponding second end 62 of the tension adjustment block 54 engaging against and/or retaining the header 26 in a corresponding second fore/aft orientation, which can provide a first intermediate tension on the flexible fabric tonneau cover 22.

Similarly, FIG. 6C illustrates a third orientation of the tension adjustment block 54 corresponding to a third fore/aft position of the header 26 relative to the side rail 24. In this third orientation, the second positioning member 52 of the adjustment block 54 can be inserted into the tension adjustment block mounting aperture 48 to define a third distance D3 between an end 66 of the positioning member 52 and a corresponding end 58 of the tension adjustment block 54 engaging against or retaining the header 26 in a corresponding third fore/aft orientation, which can provide a second intermediate tension on the flexible fabric tonneau cover 22.

As should be apparent, the same discussion above as to FIGS. 6A and 6C providing first and fourth orientations of the adjustment block 54 via inserting the same positioning member 50 within the same mounting aperture 48 in (horizontally) rotationally different orientations is likewise applicable to FIGS. 6B and 6C providing second and third orientations of the adjustment block 54 via inserting another positioning member 52 within the same mounting aperture in horizontally rotationally different orientations. In both cases, the same or a single positioning member 50 or 52 can be selectively inserted into the same adjustment block mounting aperture 48 in one of a first of the plurality of orientations that is horizontally rotationally different from a second of the plurality of orientations. In some embodiments, the first and second of the plurality of such orientations can be horizontally rotationally different from each other by 180 degrees as illustrated.

Likewise, the same discussion above as to FIGS. 6A and 6B providing first and second orientations of the adjustment block 54 via inserting one of several positioning members 50, 52 within the same mounting aperture 48 to provide different orientations of the tension adjustment block 54 is likewise applicable to FIGS. 6C (relative to 6A) and 6D (relative to 6B) providing third and fourth orientations of the adjustment block 54 via inserting different positioning members 50, 52 within the same mounting aperture. In both cases, one of multiple different positioning members 50, 52 can be selectively alternatively inserted into the same adjustment block mounting aperture 48. In some embodiments, the different positioning members 50, 52 can extend from different faces of the tension adjustment block 54. In some embodiments, such different faces, from which the positioning members 50, 52 extend, can be opposite faces of the tension adjustment block 54.

In some embodiments, the positioning members 50, 52 can have an elongate shape or other configuration that can allow the positioning members to define a first distance from a first end, 56 and 66, of the elongate positioning member, 50 and 52, respectively, to a corresponding first end 58 of the tension adjustment block 54, and allowing it to define a second distance that is different than the first distance between a second end, 60 and 64, of the elongate positioning member, 50 and 52, respectively, to a corresponding second end 62 of the tension adjustment block 54.

In some embodiments, the side rails 24 can be formed as a unified one-piece extruded strip. For example, the side rails 24 can be a unified one-piece extruded metal strip, such as aluminum. In some embodiments, the tension adjustment block mounting aperture 48 can extend through a surface of the at least one side rail 24 that extends in a fore/aft direction. In some embodiments, such a surface can be a horizontal surface when coupled to or otherwise deployed for use with the cargo box 18. In some embodiments, this fore/aft direction corresponds to the direction of extrusion of such a unified one-piece extruded strip. In some embodiments, such positioning of the tension adjustment block mounting aperture 48 can eliminate the need for any additional component of the side rail 24 beyond such a one-piece extruded member. Adoption of any of these features can help simplify the configuration of the side rails 24 and reduce associated manufacturing complexity and costs.

In some embodiments, the positioning members 50, 52 can be non-threaded members, which likewise can reduce manufacturing costs and complexity. Adoption of this feature can also eliminate the need for or a component coupled to the side rails 24 to include surfaces extending substantially perpendicular to the fore/aft direction for the mounting apertures 48 or otherwise providing a corresponding threaded mounting aperture. This can also reduce associated manufacturing complexity and costs.

In some embodiments, a retaining mechanism can be selectively engageable with the positioning members 50, 52 to retain the inserted one of the positioning members 50, 52 within the mounting aperture 48 in the selected orientation. For example, in the illustrated embodiment, such a retaining mechanism (best shown in FIG. 4.) can include a hitch pin 68 that can be selectively inserted into a selected aperture 70 and notch 71 provided in each of the positioning members 50, 52. Thus, the retaining mechanism 68 and 70 can selectively resist forces tending to remove the inserted positioning member 50 or 52 from the retention aperture 48, unless the hitch pin 68 is first removed from the selected retention aperture 70. In some embodiments, the selected retention aperture 70 can be positioned adjacent an end of the inserted positioning member 50, 52 closest to the header 26.

In some embodiments, the flexible fabric cover 22 can be coupled to the front header 26 along one edge and to the rear header 28 along an opposite edge. In some embodiments, ends of the rear header 28 can be selectively latched to, or unlatched from, two bracket latch mechanisms 30 where each bracket latch mechanism 30 is coupled to one of the two side rails 24 at a the rear of the cargo box 18. Other orientations, however, are possible. For example, the tonneau system 20 can be horizontally rotated 180 degrees so that ends of the second header 28 can be selectively latched to, or unlatched from, the two latch bracket mechanisms 30 repositioned at the front of the cargo box 18 and the first header 26 can be coupled to the side rails 24 via the fastener 36 at the rear of the cargo box 18.

As used herein, "side rail" can include a member that is a separate component, distinct from the cargo box by which the various side components (e.g., one or more of tension adjustment block 54, bracket latch mechanism 30, hook and loop fastener 32, and headers 26, 28) are indirectly coupled to the cargo box, or can be an integral portion of a cargo box 18, as manufactured, by which the various side components are directly coupled to the cargo box.

As used herein, reference to a "face" or "end" 56 of the positioning member 50 refers to any contacting portion that engages another member to retain the header as described herein. Thus, such an "end" can be provided at any place on the positioning member 50, including without limitation, along various sides and in a recessed area. Similarly, multiple "ends" need not be separate discreet elements, but can be include a sloping or cam surface.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for covering a cargo box comprising:
    two side rails, at least one side rail including a tension adjustment block mounting aperture;
    a header extending between the two side rails;
    a fabric cover coupled to the header;
    at least one tension adjustment block including at least one positioning member receivable in the tension adjustment block mounting aperture in any of a plurality of orientations;
    wherein, when the at least one tension adjustment block is selectively arranged in a first of the plurality of orientations with the at least one positioning member received in the tension adjustment block mounting aperture of the at least one side rail, the tension adjustment block defines a first distance between the mounting aperture and a first end of the tension adjustment block and retains the header at a first selected fore/aft position related to the first distance; and
    wherein, when the at least one tension adjustment block is selectively arranged in a second of the plurality of orientations with the at least one positioning member received in the tension adjustment block mounting aperture of the at least one side rail, the tension adjustment block defines a second distance between the mounting aperture and a second end of the tension adjustment block and retains the header at a second selected fore/aft position related to the second distance.

2. The tonneau cover system for covering a cargo box of claim 1, wherein the at least one positioning member of each tension adjustment block comprises two positioning members.

3. The tonneau cover system for covering a cargo box of claim 2, wherein the positioning members protrude from the tension adjustment block in opposite directions.

4. The tonneau cover system for covering a cargo box of claim 1, wherein one of the at least one positioning member is selectively insertable into the adjustment block mounting aperture in both the first and the second of the plurality of orientations, and wherein the first of the plurality of orientations is rotationally different from the second of the plurality of orientations.

5. The tonneau cover system for covering a cargo box of claim 4, wherein the first and second of the plurality of orientations are rotationally different from each other by 180 degrees.

6. The tonneau cover system for covering a cargo box of claim 1, wherein the at least one positioning member of each tension adjustment block comprises two positioning members with each of the positioning members protruding from the tension adjustment block in different directions, and wherein each of the two positioning members is selectively insertable into the adjustment block mounting aperture in two of the plurality of orientations, wherein the two of the plurality of orientations are rotationally different from each other.

7. The tonneau cover system for covering a cargo box of claim 1, wherein the header is a front header.

8. The tonneau cover system for covering a cargo box of claim 1, wherein the fabric cover is coupled to the header along one edge and to a second header along an opposite edge, and wherein the second header is selectively latched to two brackets with each bracket being coupled to one of the two side rails so that the first selected fore/aft position applies a first tension to the fabric cover, and the second selected fore/aft position applies a second tension to the fabric cover.

9. The tonneau cover system for covering a cargo box of claim 1, wherein the at least one positioning member is a non-threaded member.

10. The tonneau cover system for covering a cargo box of claim 1, wherein the tension adjustment block mounting aperture extends through a surface of the at least one side rail extending in a fore and aft direction.

11. The tonneau cover system for covering a cargo box of claim 1, wherein the at least one side rail includes a header mounting slot and a fastener extending through the header mounting slot to couple an end of the header to the at least one side rail while allowing fore and aft movement of the header along the at least one side rail.

12. The tonneau cover system for covering a cargo box of claim 11, further comprising a plastic washer between the fastener and the at least one side rail to facilitate fore and aft movement of the header relative to the at least one side rail.

13. The tonneau cover system for covering a cargo box of claim 1, wherein the at least one positioning member comprises a retention aperture, and a retention member selectively extends through the retention aperture to retain the at least one positioning member within the tension adjustment block mounting aperture.

14. A tonneau cover system for covering a cargo box comprising:
   two side rails, each side rail including a header mounting slot and a tension adjustment block mounting aperture;
   a header extending between the two side rails;
   a fabric cover coupled to the header;
   two fasteners, each fastener extending through one of the header mounting slots to couple an end of the header to each of the side rails allowing fore and aft movement of the header along the side rails;
   two tension adjustment blocks, each tension adjustment block including at least one positioning member receivable in the tension adjustment block mounting aperture in any of a plurality of orientations;
   wherein, when each tension adjustment block is selectively arranged in a first of the plurality of orientations with the at least one positioning member received in the tension adjustment block mounting aperture of one of the side rails, each tension adjustment blocks defines a first distance between the mounting aperture and a first end of the tension adjustment block and retains the header at a first selected fore/aft position related to the first distance; and
   wherein, when each tension adjustment block is selectively arranged in a second of the plurality of orientations with the at least one positioning member received in the tension adjustment block mounting aperture of one of the side rails, each tension adjustment block defines a second distance between the mounting aperture and a second end of the tension adjustment block and retains the header at a second selected fore/aft position related to the second distance.

15. The tonneau cover system for covering a cargo box of claim 14, wherein the at least one positioning member of each tension adjustment block comprises two positioning members, and each of the positioning members protruding from the tension adjustment block in different directions.

16. The tonneau cover system for covering a cargo box of claim 14, wherein one of the at least one positioning member is selectively insertable into the adjustment block mounting aperture in both the first and the second of the plurality of orientations, and wherein the first of the plurality of orientations is rotationally different from the second of the plurality of orientations.

17. The tonneau cover system for covering a cargo box of claim 14, wherein the at least one positioning member of each tension adjustment block comprises two positioning members with each of the positioning members protruding from the tension adjustment block in different directions, and wherein each of the two positioning members is selectively insertable into the adjustment block mounting aperture in two of the plurality of orientations, wherein the two of the plurality of orientations are rotationally different from each other.

18. The tonneau cover system for covering a cargo box of claim 17, wherein the two positioning members protrude from the tension adjustment block in opposite directions.

19. The tonneau cover system for covering a cargo box of claim 17, wherein the two of the plurality of orientations are rotationally different from each other by 180 degrees.

20. The tonneau cover system for covering a cargo box of claim 17, wherein the at least two positioning members are non-threaded members.

21. The tonneau cover system for covering a cargo box of claim 17, wherein the tension adjustment block mounting aperture extends through a surface of the at least one side rail extending in a fore and aft direction.

22. The tonneau cover system for covering a cargo box of claim 17, further comprising a plastic washer between each fastener and the side rail to facilitate fore and aft movement of the header relative to each side rail.

23. The tonneau cover system for covering a cargo box of claim 17, wherein each of the at least two positioning members comprise a retention aperture, and a retention member selectively extends through the retention aperture to retain a selected one of the at least two positioning members within the tension adjustment block mounting aperture.

24. The tonneau cover system for covering a cargo box of claim 17, wherein the fabric cover is coupled to the header along one edge and to a second header along an opposite edge, and wherein the second header is selectively latched to two brackets with each bracket being coupled to one of the two side rails so that the first selected fore/aft position applies a first tension to the fabric cover, and the second selected fore/aft position applies a second tension to the fabric cover.

* * * * *

UNITED STATES PATENT AND TRADEMARK OFFICE
CERTIFICATE OF CORRECTION

PATENT NO. : 9,604,524 B1
APPLICATION NO. : 14/857474
DATED : March 28, 2017
INVENTOR(S) : Joel L. Carlson et al.

Page 1 of 1

It is certified that error appears in the above-identified patent and that said Letters Patent is hereby corrected as shown below:

On the Title Page

Column 1, (22) Filed, after "Sep. 17, 2015": insert --¶(65) Prior Publication Data US 2017/0080786 A1 Mar. 23, 2017-- therefor Signed and Sealed this
Eighth Day of August, 2017

Joseph Matal
*Performing the Functions and Duties of the*
*Under Secretary of Commerce for Intellectual Property and*
*Director of the United States Patent and Trademark Office*